UNITED STATES PATENT OFFICE.

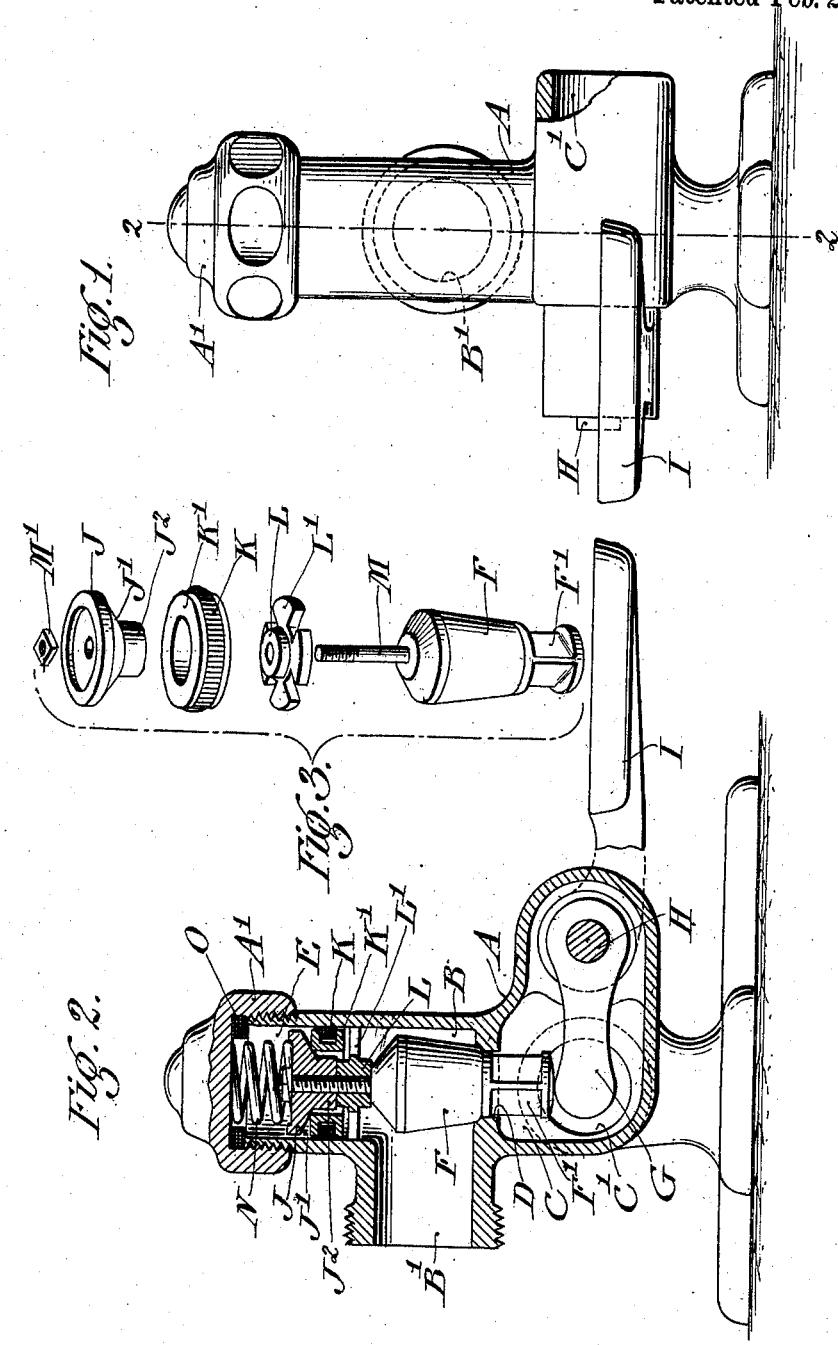

WILLARD A. SPEAKMAN, OF WILMINGTON, DELAWARE.

VALVE.

985,220.

Specification of Letters Patent.   Patented Feb. 28, 1911.

Application filed October 29, 1909.   Serial No. 525,263.

*To all whom it may concern:*

Be it known that I, WILLARD A. SPEAKMAN, a resident of Wilmington, in the county of New Castle, in the State of Delaware, have invented a certain new and useful Improvement in Valves, of which the following is an exact and true description, reference being had to the accompanying drawings, which form a part thereof.

My present invention relates to that type of valve in which provisions are made for causing the valve to close automatically when permitted to do so and in which a dash pot mechanism is provided for causing the valve to close slowly so that the fluid controlled by the valve may continue to flow for an appreciable and predetermined period after the valve is free to close.

The object of the present invention is to provide a valve of the kind specified with mechanism controlling the closure of the valve which is simple and relatively inexpensive to construct and is effective and reliable in operation, and free from liability of having its proper operation interfered with by particles of sand or the like in the fluid passing through the valve.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described one of the many forms in which the invention may be embodied.

Of the drawings, Figure 1 is an elevation of the assembled valve Fig. 2 is a section on the line 2—2 of Fig. 1, and Fig. 3 is an exploded perspective view showing the valve proper and the parts of the attached dash pot piston.

In the particular embodiment of the invention shown for the purpose of illustration in the drawings, A represents a one piece valve casing which is formed with inlet and outlet chambers B and C respectively, a valve seated port D connecting said chambers, inlet and outlet passages B' and C', respectively, and dash pot chamber E of cylindrical form and coaxial with the port D and in open communication with the inlet chamber B. The port D is controlled by a valve member F which may be of any suitable form and, as shown, has its body portion on the inlet side of the port D and a guide portion F' projecting through the port. The valve F is moved off its seat by an arm G carried by a shaft H projecting through the wall of the outlet chamber C of the valve casing and provided without the casing with an operating arm I which, in the form shown, is a pedal.

The dash pot piston, to which my present invention particularly pertains, comprises a follower J, a stem M connecting the follower J to the valve member F, and a washer surrounding the stem M. The washer comprises a non-metallic body portion K formed of chrome leather or other suitable material, and a metallic portion which is interposed between the adjacent surface of the follower J and the washer body K. Preferably, as shown, the metallic portion of the washer is in the form of an annulus K' having a groove in its periphery in which the washer body K is received. The washer should have some, but preferably not much play toward and away from the follower J. The movement of the washer away from the follower might be limited by the engagement of the washer directly with portions of the valve proper but preferably as shown such movement is checked by the arms L' of a spider member L mounted on the stem M. In the construction illustrated the stem M is in the form of a rod secured at one end to the valve and having the other end threaded. The member L engages the valve member F and is clamped between the valve and the hub of the follower J by a nut M' on the threaded end of the stem M. The washer body portion K fits snugly against the inner wall of the piston chamber E but the opening through the annular member K' is of appreciably greater diameter than the body of member L and the hub $J^2$ of member J. The latter is of somewhat smaller cross sectional area than the chamber E and has its end surface J' adjacent the washer conical while the adjacent end of the annular member K' is plane. A spring N extends between the outer end of the follower J and the cap A' which, with the washer O, closes the outer end of chamber E.

In operation, when it is desired to open the valve, the arm or pedal is depressed and thereby moves the valve F off its seat, thus opening the port D. As the valve leaves its seat the washer remains stationary until it is engaged by the arms L' of member L, after which the washer moves with the valve until the opening movement of the latter is completed. In consequence, the washer does not materially impede the opening movement of the valve, for any fluid in the chamber E above the piston can escape freely through the slight space between the follower surface J² and the member K', the central passage through the latter and the spaces between arms L'. When the valve is free to close it starts to do so under the action on the valve of the fluid flowing through the valve casing and the action of the spring N. The initial closing movement of the valve brings the surface J² of the follower against the end of annular member K' and thereafter the washer travels with the valve. This retards the closing movement of the valve F for on account of the snug fit of the non-metallic washer portion K with the wall of chamber E and with the member K', the only way in which the upper end of the chamber E can fill with liquid is by leakage between the surface J' of the follower and the contacting surface of the member K'.

To permit a restricted leakage between the follower and the surface of the member K' engaged by it, the coöperating annular surfaces of these members are arranged to contact roughly. This means that in practice neither of the coöperating contact surfaces is carefully machined to give a smooth finish. With roughness of contact between the surfaces J' and the corresponding surface of the member K' in conjunction with the narrow width of the contact surfaces due to their non-parallelism the desired restricted leakage is readily obtained. At the same time, the operation of the device is not greatly affected by sand or dirt in the water or other fluid controlled by the valve. There are no restricted parts or channels to be obstructed by such foreign matter and the only effect produced by its presence is to accelerate and not retard the closing of the valve. In consequence, particles of sand or the like getting between the follower and the metallic portion of the washer do not remain in place but on the contrary are almost instantly floated out.

The construction disclosed is obviously durable as well as reliable. The non-metallic portion of the composite washer is so effectively reinforced by the member K' that it deteriorates very slowly and of course maintains its shape well.

Having now described my invention, what I claim as new, and desire to secure by Letters Patent, is:

1. In a self closing valve, the combination of a valve casing formed with a valve seated port and a dash pot chamber, a valve controlling said port, and a dash pot piston secured to said valve and comprising a metallic follower of less cross sectional area than said chamber, a portion of still smaller cross section connecting the valve and follower, and a composite washer loosely surrounding said portion and having a non-metallic body portion snugly fitting in said chamber, and a metallic portion adapted to engage said follower during the closing movement of the valve, said follower and said metallic washer portion having coöperating annular surfaces which contact roughly, whereby a restricted leakage may occur between said surfaces.

2. In a self closing valve, the combination of a valve casing formed with a valve seated port and a dash pot chamber, a valve controlling said port, and a dash pot piston secured to said valve and comprising a metallic follower of less cross sectional area than said chamber, a portion of still smaller cross section connecting the valve and follower, and a composite washer loosely surrounding said portion and having a non-metallic body portion snugly fitting in said chamber, and a metallic portion, said follower and metallic washer portion having coöperating narrow annular surfaces which contact roughly, whereby a restricted leakage may occur between said surfaces.

3. In a self closing valve, the combination of a valve casing formed with a valve seated port and a dash pot chamber, a valve controlling said port, and a dash pot piston secured to said valve and comprising a metallic follower of less cross sectional area than said chamber, a portion of still smaller cross section connecting the valve and follower, and a composite washer loosely surrounding said portion and having a non-metallic body portion rectangular in cross section snugly fitting in said chamber, and an annular metallic portion adapted to engage said follower during the closing movement of the valve, and formed with a groove in its periphery receiving said non-metallic body portion, said follower and said metallic washer portion having coöperating annular surfaces which contact roughly, whereby a restricted leakage may occur between said surfaces.

4. In a self-closing valve, the combination of a valve casing formed with a valve seated port and a dash pot chamber, a valve controlling said port, and a dash pot piston secured to said valve and comprising a metallic follower of less cross sectional area than said chamber, a portion of still smaller cross section connecting the valve and follower, and a composite washer loosely surrounding said portion and having a non-metallic body portion snugly fitting in said chamber, and an annular metallic portion adapted to engage said follower during the closing movement of the valve, and formed with a groove in its periphery receiving said non-metallic body portion, said annular metallic portion and said follower having non-parallel engaging surfaces which contact roughly, whereby a restricted leakage may occur between said surfaces.

5. In a self closing valve, the combination of a valve casing formed with inlet and outlet chambers and a valve seated port connecting said chambers and formed also with a dash pot chamber on the inlet side of and in alinement with said port, and in open communication at its inner end with said inlet chamber, a valve controlling said port, a dash pot piston, means connecting it to the valve comprising a stem secured to the valve at one end, a follower secured to the stem adjacent its other end, a spider like member carried by the stem between the valve and said follower, and a composite washer surrounding said stem and capable of some axial movement between the follower and spider like member, said washer comprising a non-metallic body portion adapted to fit snugly in said dash pot chamber and an annular metallic body formed with a peripheral groove in which said non-metallic body portion is received, said annular metallic portion and follower having narrow, non-parallel, engaging, surfaces which contact roughly, whereby a restricted leakage may occur between said surfaces, and a spring acting on the follower in a direction to move the valve toward its seat.

WILLARD A. SPEAKMAN.

Witnesses:
ARNOLD KATZ,
D. STEWART.